United States Patent
Francini (10) Patent No.: US 8,441,927 B2
(45) Date of Patent: May 14, 2013

(54) SYSTEM AND METHOD FOR IMPLEMENTING PERIODIC EARLY DISCARD IN ON-CHIP BUFFER MEMORIES OF NETWORK ELEMENTS

(75) Inventor: Andrea Francini, Mooresville, NC (US)

(73) Assignee: Alcatel Lucent, Paris (FR)

( * ) Notice: Subject to any disclaimer, the term of this patent is extended or adjusted under 35 U.S.C. 154(b) by 302 days.

(21) Appl. No.: 13/006,142

(22) Filed: Jan. 13, 2011

(65) Prior Publication Data
US 2012/0182870 A1 Jul. 19, 2012

(51) Int. Cl.
*G06F 11/00* (2006.01)
*H04J 1/16* (2006.01)
*H04L 1/00* (2006.01)
*H04L 12/26* (2006.01)

(52) U.S. Cl.
USPC ..... 370/230; 370/230.1; 370/235; 370/235.1; 370/412

(58) Field of Classification Search ....... 370/230–235.1, 370/412
See application file for complete search history.

(56) References Cited

U.S. PATENT DOCUMENTS

| | | | |
|---|---|---|---|
| 5,938,749 A | | 8/1999 | Rusu et al. |
| 6,128,642 A | * | 10/2000 | Doraswamy et al. ......... 709/201 |
| 6,687,247 B1 | * | 2/2004 | Wilford et al. ............... 370/392 |
| 6,990,113 B1 | * | 1/2006 | Wang et al. ................... 370/412 |
| 7,391,785 B2 | * | 6/2008 | Chang et al. .................. 370/412 |
| 7,558,270 B1 | * | 7/2009 | Wilford et al. ........... 370/395.42 |
| 2002/0059408 A1 | * | 5/2002 | Pattabhiraman et al. ..... 709/223 |
| 2003/0007454 A1 | * | 1/2003 | Shorey .......................... 370/229 |
| 2003/0067877 A1 | * | 4/2003 | Sivakumar et al. ........... 370/232 |
| 2004/0042397 A1 | * | 3/2004 | Chang et al. .................. 370/230 |
| 2006/0045011 A1 | * | 3/2006 | Aghvami et al. ............. 370/230 |

FOREIGN PATENT DOCUMENTS
WO     WO 03052556 A2     6/2003

OTHER PUBLICATIONS

S. Floyd et al, "Adaptive RED: An Algorithm for Increasing the Robustness of RED's Active Queue Management", Aug. 1, 2001, under submission, AT&T Center for Internet Research at ICSI, pp. 1-12.

(Continued)

*Primary Examiner* — Chuong T Ho
(74) *Attorney, Agent, or Firm* — M. J. Hodulik (57) ABSTRACT

An advance is made over the prior art in accordance with the principles of the present invention that is directed to a new approach for a system and method for a buffer management scheme called Periodic Early Discard (PED). The invention builds on the observation that, in presence of TCP traffic, the length of a queue can be stabilized by selection of an appropriate frequency for packet dropping. For any combination of number of TCP connections and distribution of the respective RTT values, there exists an ideal packet drop frequency that prevents the queue from over-flowing or under-flowing. While the value of the ideal packet drop frequency may quickly change over time and is sensitive to the series of TCP connections affected by past packet losses, and most of all is impossible to compute inline, it is possible to approximate it with a margin of error that allows keeping the queue occupancy within a pre-defined range for extended periods of time. The PED scheme aims at tracking the (unknown) ideal packet drop frequency, adjusting the approximated value based on the evolution of the queue occupancy, with corrections of the approximated packet drop frequency that occur at a timescale that is comparable to the aggregate time constant of the set of TCP connections that traverse the queue.

20 Claims, 8 Drawing Sheets

OTHER PUBLICATIONS

Wu-Chang Feng et al, "A Self-Configuring RED Gateway", INFOCOM '99. Eighteenth Annual Joint Conference of the IEEE Computer and Communications Societies. Proceedings, Mar. 21-25, 1999, New York, NY, vol. 3, pp. 1320-1328.

G. Appenzeller et al, "Sizing Router Buffers", SIGCOMM 2004, Aug. 30-Sep. 3, 2004, Portland, Oregon, 12 pages.

A. Vishwanath et al, "Perspectives on Router Buffer Sizing: Recent Results and Open Problems", ACM SIGCOMM Computer Communication Review, vol. 39, No. 2, Apr. 2009, pp. 34-39.

Y. Ganjali et al, "Update on Buffer Sizing in Internet Routers", ACM SIGCOMM Computer Communication Review, vol. 36, No. 5, Oct. 2006, pp. 67-70.

C. Villamizar et al, "High Performance TCP in ANSNET", ACM SIGCOMM Computer Communication Review, vol. 24, Issue 5, Oct. 1994, pp. 45-60.

S. Floyd et al, "Random Early Detection Gateways for Congestion Avoidance", IEEE/ACM Transactions on Networking, vol. 1, No. 4, Aug. 1993, pp. 397-413.

V. Jacobson et al, RED in a Different Light, Draft of Sep. 30, 1999, pp. 1-38.

PCT International Search Report, PCT/US2012/020247, International Filing Date Jan. 5, 2012, Date of Mailing Apr. 12, 2012, 3 pages.

* cited by examiner

$$\text{if } (\bar{q} < b_{min}^{PED}) \text{ then}$$
$$\alpha = \bar{q}/b_{min}^{PED}$$
$$T_D[m] = \min\{T_{D,\,max},\, \alpha\, T_D[m-1] + (1-\alpha)\cdot K \cdot T_D[m-2]\}$$
$$\text{else if } (\bar{q} < b_{max}^{PED}) \text{ then}$$
$$\alpha = b_{max}^{PED}/\bar{q}$$
$$T_D[m] = \max\{T_{D,\,min},\, \alpha\, T_D[m-1] + (1-\alpha)\cdot T_D[m-2]/K\}$$

SYSTEM AND METHOD FOR IMPLEMENTING PERIODIC EARLY DISCARD IN ON-CHIP BUFFER MEMORIES OF NETWORK ELEMENTS

This invention was made with Government support under Grant DE-EE0002887 awarded by the United States Department of Energy. The Government has certain rights in the invention.

TECHNICAL FIELD

This invention relates generally to communications systems and more particularly to memory allocation for packet buffers of network elements in IF networks.

BACKGROUND OF THE INVENTION

A network flow is a sequence of data packets that carry identical values in the source address field of the Internet Protocol (IP) packet header, in the destination address field of the IP header, possibly in other fields of the IP header, and also in fields of other protocol headers, such as the source and destination port number fields of the Transmission Control Protocol (TCP) header. An example of a network flow is the sequence of packets generated by the traffic source (or the sender) of a TCP connection.

Packet switches and routers in many portions of the network allocate a single queue to multiple flows whose packets are to be dispatched over the same output link. An alternative to using a single queue for multiple flows is to assign packets of different flows to different queues, but this may be impractical in front of links that accommodate large numbers (thousands and higher) of network flows. In cases where a single queue is used to accommodate packets of multiple flows, the sizing of the buffer space allocated for the queue is typically driven by the need to avoid losses of link utilization in presence of TCP traffic.

The adaptive behavior of TCP sources makes the utilization of a link traversed by TCP traffic very sensitive to the policy that the buffer in front of the link uses for deciding on the admission of new packets at times of congestion. In absence of packet losses, the TCP sources keep increasing the amount of traffic they generate, causing further congestion in the packet buffer and filling the available buffer space. Instead, when a packet is dropped the corresponding source reduces its activity, which after some time relieves congestion in front of the bottlenecked link. Full utilization of the link is achieved when the buffer is never emptied and is the result of a fine balance between the fraction of TCP sources that recognize packet losses and the fraction of TCP sources that are allowed to keep increasing their traffic generation rate.

For many years, it was commonly accepted within the IP networking research and development community that, in front of a link with capacity C, a buffer space of $C \cdot \overline{\theta}$ should be allocated for a queue handling TCP traffic flows, where $\overline{\theta}$ is the average packet round-trip time (RTT) estimated over all the TCP flows in the queue. The goal of this buffer allocation criterion, first advocated in C. Villamizar and C. Song, "High-Performance TCP in ANSNET," ACM Computer Communications Review, 24(5):45-60, 1994 [Villamizar, 1994] and commonly referred to as the bandwidth-delay product (BDP) rule, is to avoid queue underflow conditions, and therefore reductions of link utilization, as a consequence of packet losses occurring at the queue at times of traffic congestion. With $\overline{\theta}$=250 ms and C=40 Gbp·s, which are typical values for 2010 core network links, the buffer space needed in front of the link is 10 Gbit=1.25 GB. This relatively large buffer size constitutes a major issue for network equipment manufacturers and network operators for at least two reasons. First, the size of the buffer makes it impossible to implement on-chip buffer memories, negatively impacting system density, design cost, and energy consumption. Second, a buffer sized with the BDP rule may easily add a contribution in the order of magnitude of the average RTT to the end-to-end forwarding delay of packets. This large added delay, possibly encountered by a packet multiple times along the data path of its network flow, may cause major degradations in the end-user perception of network applications.

In S. Floyd and V. Jacobson, "Random Early Detection Gateways for Congestion Avoidance," IEEE/ACM Transactions on Networking, 1(4):397-413, 1993 [Floyd, 1993], the authors introduce a buffer management scheme called Random Early Detection (RED) where packets may start being dropped long before the queue occupancy approaches the available buffer space. The purpose of RED is to distribute the losses of packets as fairly as possible across all TCP flows that traverse the queue, and avoid the global synchronization condition, whereby a large number of TCP sources simultaneously stop sending packets after massive back-to-back packet losses, causing reductions of link utilization. With RED, the decision to drop packets is based on the comparison of a small set of buffer occupancy thresholds ($b_{min}$ and $b_{max}$) with an average queue length (AQL) that is updated at every packet arrival. Together with the maximum drop probability $p_{max}$, the current placement of the AQL relative to the buffer occupancy thresholds defines the probability of dropping a packet upon its arrival to the queue. While the merits of RED have been generally established, the technique is only partially utilized in practical network equipment because the performance of the scheme is heavily sensitive to the appropriate tuning of the scheme's parameters according to the characteristic of the TCP traffic in the queue.

Having recognized the sensitivity of the RED performance to the degree of matching between the traffic characteristics (mainly qualified by the number of active TCP flows and by the per-flow distribution of RTT values) and the chosen values for the RED configuration parameters (those that define the profile of the packet drop probability curve, plus the averaging weight w, which approximately defines the cutoff frequency of the low-pass filter that implements the AQL), both authors of the original RED have subsequently proposed modifications aimed at improving the performance of the algorithm.

In V. Jacobson, K. Nichols, and K. Poduri, "RED in a Different Light," Unpublished, 1999, <http://www.cnaf.infn.it/~ferrari/papers/ispn/red_light_9_30.pdf> [Jacobson, 1999], the authors offer useful recommendations to improve the performance of RED and simplify its configuration. Such recommendations include: (a) updating the AQL with instantaneous queue length samples gathered at fixed time intervals, instead of relying on packet arrivals; (b) setting the cutoff frequency of the low-pass filter that defines the AQL at a value that is low enough to smooth out all queue length dynamics that occur at the same timescale as the RTT; and (c) setting the value of the buffer occupancy threshold where packets start being dropped at $b_{min}$=0.3·C·$\overline{\theta}$, where $\overline{\theta}$=100 ms if the actual distribution of RTT values is not known. While the recommendations contribute to improving the link utilization of RED, they are not sufficient to avoid losses of link utilization under a broad set of traffic scenarios. Furthermore, the choice of $b_{min}$=0.3·C·$\overline{\theta}$ fails to deliver substantial reductions of allocated buffer memory compared to the C·$\overline{\theta}$ mandate of the BDP rule.

In S. Floyd, R. Gummadi, and S. Shenker, "Adaptive RED: An Algorithm for Increasing the Robustness of RED's Active Queue Management," Unpublished, 2001, <http://icir.org/floyd/papers/adaptiveRed.pdf> [Floyd, 2001], the authors take advantage of the recommendations in [Jacobson, 1999] and of concepts newly presented in W. Feng, D. Kandlur, D. Saha, and K. Shin, "A Self-Configuring RED Gateway," Proceedings of IEEE Infocom 1999 [Feng, 1999] to define an Adaptive RED (ARED) algorithm where the slope of the drop probability function dynamically adjusts to the evolution of the AQL, increasing it when the AQL exceeds an upper threshold $b_u$ and decreasing it when the AQL falls below a lower threshold $b_l$. Compared to the original formulation of RED, the ARED upgrade improves both performance and ease of configuration, and leaves the network administrator with only two parameters to configure: the expected value of $\bar{\theta}$ and the desired value of the average queueing delay d. The algorithm that controls the slope of the packet drop probability is not optimized in [Floyd, 2001] for robustness and speed of convergence. Furthermore, it still relies on the mapping of AQL levels onto packet drop probabilities: the higher the drop rate needed to maintain the packet buffer within stability boundaries, the higher the AQL that sets that drop rate and therefore also the contribution of the buffer to the overall RTT experienced by the TCP flows. Finally, the linear dependency of the packet drop probability on the AQL remains a cause of instability for ARED as it is for the native formulation of RED, and leads to losses of link utilization that may be substantial under ordinary traffic configurations.

More recently, in G. Appenzeller; I. Keslassy, and N. McKeown, "Sizing Router Buffers," Proceedings of ACM SIGCOMM 2004, Portland, Oreg., August 2004 [Appenzeller, 2004], the authors study the sizing requirements for a buffer that accommodates a large number of desynchronized TCP flows in front of a high-speed network link, concluding that a buffer size in the order of magnitude of $C \cdot \bar{\theta}/\sqrt{N}$, where N is the number of desynchronized long-lived TCP flows at the link, is sufficient to keep the probability of occurrence of the buffer underflow condition under a controllable portion of the total time. In a network link with many thousands of desynchronized long-lived bottlenecked TCP flows (a set of TCP flows is desynchronized when the transmission windows of the flows in the set reach their peaks at different times; a long-lived TCP flow is one whose source has left the slow-start state at least once; a bottlenecked TCP flow is one for which the average end-to-end throughput is set by the fair share that the flow receives at the congested buffer under consideration), the authors of [Appenzeller, 2004] state that their small-buffer rule should yield a reduction in the size of the packet buffer that is sufficient to enable its implementation using on-chip memory. However, the robustness and scope of this buffer-size reduction approach have been successfully challenged in many papers that followed, finally inducing the original authors of the proposals to drastically revise their conclusions.

What is desirable is a buffer management/packet admission scheme that allows network system designers to reduce the amount of memory needed for buffering packets in front of network interfaces, so that the same memories can be integrated in the same hardware components that process and forward packets, instead of requiring separate hardware components only for buffering purposes.

SUMMARY OF THE INVENTION

An advance is made over the prior art in accordance with the principles of the present invention that is directed to a new approach for a system and method for a buffer management scheme called Periodic Early Discard (PED). The invention builds on the observation that, in presence of TCP traffic, the length of a queue can be stabilized by selection of an appropriate frequency for packet dropping. For any combination of number of TCP connections and distribution of the respective RTT values, there exists an ideal packet drop frequency that prevents the queue from over-flowing or under-flowing. While the value of the ideal packet drop frequency may quickly change over time and is sensitive to the series of TCP connections affected by past packet losses, and most of all is impossible to compute inline, it is possible to approximate it with a margin of error that allows keeping the queue occupancy within a pre-defined range for extended periods of time. The PED scheme aims at tracking the (unknown) ideal packet drop frequency, adjusting the approximated value based on the evolution of the queue occupancy, with frequency corrections that occur at a timescale that is comparable to the aggregate time constant of the set of TCP connections that traverse the queue.

In one embodiment of the invention, a method of operating a packet buffer in a communications network is set forth, wherein the packet buffer is operable to accept multiple flows of packets. The method includes the steps of providing a drop timer of a given period, where expiration of the given period triggers sampling of an instantaneous queue length (IQL) value and of an average queue length (AQL) value of said packet buffer. A next incoming packet to said packet buffer is marked if the IQL value is greater than a minimum queue threshold of the packet buffer and the AQL value is greater than a gating queue threshold of the packet buffer. A next incoming packet and packets that follow up to a next expiration of the given period is not marked if the IQL value is less than the minimum queue threshold of the packet buffer or the AQL value is less than the gating queue threshold of the packet buffer.

In another embodiment an incoming packet that is marked is immediately dropped without being admitted to said packet buffer, and an incoming packet that is not marked is considered eligible for admission to said packet buffer.

In another embodiment an incoming packet that is marked is modified in one or more of its internal fields and is considered eligible for admission to said packet buffer.

Another embodiment of the invention includes a fixed drop timer and another embodiment includes a variable drop timer that is adjusted at given correction intervals. In another embodiment, the given correction intervals for adjusting said given period of said drop timer are of fixed duration. In one embodiment of the invention, the given to period of the drop timer remains unchanged if the AQL value is between the minimum queue threshold and the maximum queue threshold when one of said given correction intervals expires. The given period of said drop timer increases if the AQL value is less than the minimum queue threshold of said packet buffer when one of said given correction intervals expires and the given period of said drop timer decreases if the AQL value is greater than a maximum queue threshold of said packet buffer when one of said given correction intervals expires. The increase of the given period of the drop timer is larger when the ratio between the AQL value and the minimum queue threshold of the packet buffer is smaller and the decrease of the given period of said drop tinier is larger when the ratio between said AQL value and the maximum queue threshold is larger.

In another embodiment, there is further included a safety queue threshold of the packet buffer, wherein emergency corrections of the given period of said drop timer may be made prior to expiration of the current one of said given correction intervals when the AQL value exceeds the safety threshold.

In one embodiment a new value of the given period of the drop timer is computed as a function of at least two most recent values of said given period. In one embodiment, other methods for deciding on the admission or marking of next incoming packets may be in operation at the same time in the packet buffer.

In another embodiment, the AQL and IQL values are measured in sub-packet data units and the marking action applies to a given amount of said sub-packet data units that may be contained in one next incoming packet or in a plurality of next incoming packets. In one embodiment, the sub-packet data units are bytes. In another embodiment, the sub-packet data units are memory words.

The present invention also pertains to a communications device having memory, the memory having stored therein a plurality of instructions, said device further including a packet buffer, the packet buffer operable to accept multiple flows of packets, wherein the plurality of instructions, when executed by a processor, cause the processor to perform the steps of the aforementioned method.

In another embodiment of the invention, a method of operating a packet buffer in front of a data link in a communications network is disclosed, wherein incoming packets are marked at a set frequency. The method includes the steps of holding a value of the set frequency for a time that is substantially longer than a time required by transmission of a packet over the data link and replacing the value of the set frequency by a new value when a number of packets in the packet buffer reaches pre-defined thresholds.

BRIEF DESCRIPTION OF THE DRAWING

The teachings of the present invention can be readily understood by considering the following detailed description in conjunction with the accompanying drawings, in which.

DETAILED DESCRIPTION

Exemplary embodiments of the invention will now be described while referring to the figures, several of which may be simultaneously referred to during the course of the following description. Before describing the present invention, however, we will continue with some discussion of the prior art as it relates to aspects of the present invention.

The massive research effort that followed the publication of [Appenzeller, 2004], thoroughly summarized in A. Vishwanath, V. Sivaraman, and M. Thottan, "Perspectives on router buffer sizing: Recent results and open problems," ACM SIGCOMM Computer Communication Review 39(2):34-39, 2009 [Vishwanath, 2009], did not yield straightforward solutions for extending the results of [Appenzeller, 2004] to more general settings with fewer and possibly synchronized long-lived flows, as in edge and private-network links, and actually led in Y. Ganjali and N. McKeown, "Update on buffer sizing in Internet routers," ACM SIGCOMM Computer Communication Review, 36(5):67-70, 2006 [Ganjali, 2006] to a conservative revision of the small buffer rule even for core network links: $Q_{max}=C \cdot \bar{\theta}/10$.

Buffer management schemes that rely on the early detection of congestion for smoothly controlling the activity of TCP sources so as to avoid both buffer-overflow and buffer-underflow events hold the promise of better effectiveness at keeping the link utilization close to the ideal 100% target. Of all RED flavors proposed in the literature, the Adaptive RED (ARED) family (as in [Feng, 1999] and [Floyd, 2001]) appears to offer the best combination of ease of configuration (only two parameters to be configured, of which one depends on performance targets, the other on estimated network path characteristics) and link utilization performance. In general, the tighter the delay performance, the smaller the total buffer space required. The accuracy in the estimation of the network path characteristics, namely the average RTT for the set of ongoing TCP connections, defines the speed at which the closed-loop control of ARED locks onto the optimal slope of the packet drop probability needed to keep the buffer clear of buffer overflow and buffer underfloor events.

While the incremental improvements enabled by ARED over the original RED version and over a plain tail-drop policy are not questionable, the scheme as originally defined presents four flaws that can impair its performance under certain traffic configurations. First, the scheme does not include provisions for avoiding operation of the closed-loop control under uncongested conditions. As a consequence, the slope of the drop probability may end up locked at the lower end of the available range without ever being able to react to the eventual occurrence of fast-developing congestion periods. Second, the buffer equilibrium condition, reached when the frequency of the packet drop events matches the traffic growth rate determined by the ratio between the number of TCP connections in congestion avoidance state and their respective RTT values, is associated with a specific value of the AQL, so that higher drop probabilities (needed in the presence of more TCP connections and shorter network paths) come with higher average queueing delays. Third, the use of probability instead of a fixed time interval in defining the time spacing between consecutive drop events adds irregularity to the sequence of drop events and therefore causes wider oscillations around the equilibrium point. Fourth, the packet drop decision is based on the observation of the AQL, which increases the distance between the time when a corrective action on the buffer occupancy growth is taken (by dropping a packet) and the time when the effect of that correction is measured (by observing the AQL). The network path intrinsically introduces a delay comparable to RTT between the time when a connection loses a packet and the time when the packet loss translates into a reduction of source activity, measurable through the instantaneous queue length (IQL). The use of the AQL for packet dropping decisions introduces an additional delay that can be as large as the inverse of the cutoff frequency of the low-pass filter that implements the AQL computation. Since ideally the cutoff frequency of the filter is set to the inverse of the RTT value (if not smaller), using the AQL for packet drop decisions doubles the time inaccuracy of that decision.

While the first flaw of ARED can be corrected with simple modifications of the algorithm that controls the slope of the packet drop probability, the other three flaws are intrinsic of the RED definition, so that their resolution calls for a radically different approach to the early detection of congestion conditions.

Figure 1:
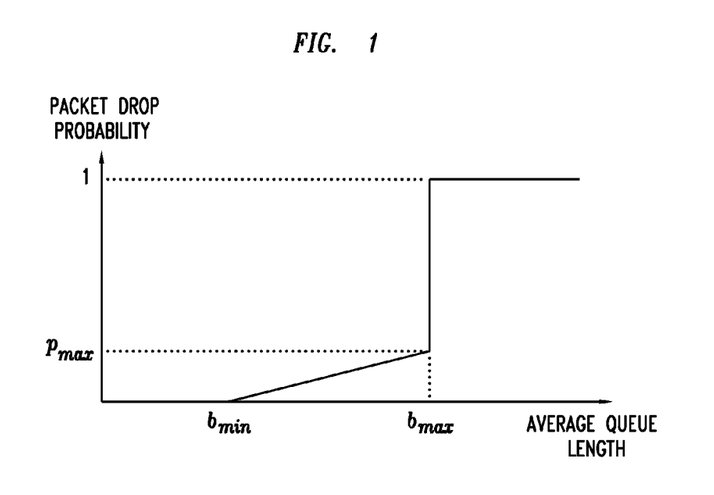
FIG. 1 shows a drop probability curve of the native RED scheme.

FIG. 1 shows a typical profile of the function that maps AQL levels onto packet drop probabilities. With the function of FIG. 1, RED drops no packet as long as the AQL $\bar{q}$ remains below the minimum threshold $b_{min}$. When the AQL is between the minimum threshold $b_{min}$ and the maximum threshold $b_{max}$, an incoming packet is dropped with probability that depends linearly on the current position of the AQL between the two thresholds (the probability is $p_{max}$ when $\bar{q}=b_{max}$). RED drops every incoming packet when $\bar{q}>b_{max}$ and also when the IQL exceeds a threshold $Q_{max}>b_{max}$ that defines the total buffer space available. The use of the AQL instead of the IQL isolates the packet drop decision from short-term IQL fluctuations that reflect ordinary TCP dynamics and not the onset of congestion conditions, and should therefore have no impact on the packet drop rate.

Figure 2:
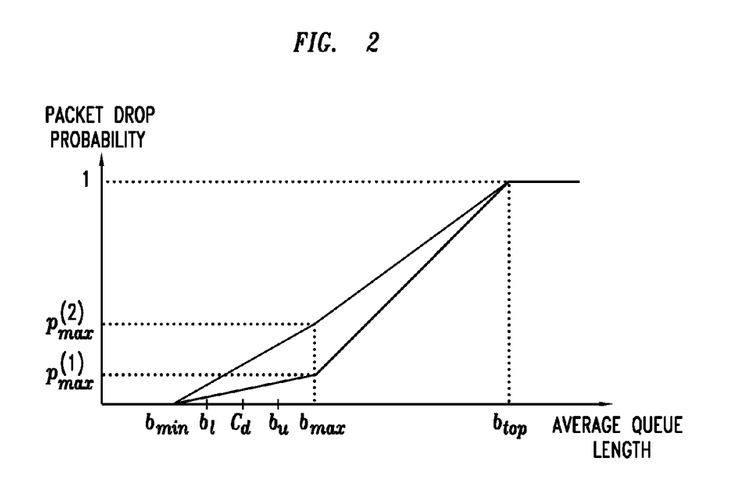
FIG. 2 shows an adjustable packet drop probability curve of Adaptive RED.

The Adaptive RED (ARED) algorithm, as specified in [Floyd, 2001], subjects $p_{max}$ to a control algorithm that sets its value within a pre-defined range. To ensure that slow reactions of the control loop to variations in traffic conditions do not trigger packet drop sequences of excessive density, which may induce global synchronization conditions with catastrophic losses of link utilization, ARED adopts a gentle version of the drop probability curve, which grows linearly between ($b_{max}$, $p_{max}$) and ($b_{wp}=2b_{max}$, 1) instead of jumping immediately from ($b_{max}^-$, $p_{max}$) to ($b_{max}^+$, 1) (see FIG. 2). After holding the same $p_{max}$ value for at least a time T (500 ms is the value recommended in [Floyd, 2001]), the control algorithm reduces $p_{max}$ as soon as the AQL exceeds a threshold $b_u$, Or increases it as soon as the AQL drops below a threshold $b_l$, with the ultimate goal of settling the AQL around $b_d=C\cdot d$ where d is the target average delay ($b_{min}<b_l<b_d<b_u<b_{max}$). The authors of [Floyd, 2001] automatically derive all buffer thresholds from the target average delay d, relieving the user from the uncertainty of their configuration: $b_{min}=0.5\ b_d$, $b_l=0.9\ b_d$, $b_u=1.1\ b_d$, and $b_{max}=1.5\ b_d$. The range of allowed $p_{max}$ values is also fixed: [0.01, 0.5]. By following all recommendations for default values, the user is left with the target average delay (or the desired total allocation of buffer space $Q_{max}\geq b_{top}$) as the only arbitrary parameter. In a nutshell, ARED combines the native RED with a mechanism for controlling the slope of the two portions of the packet drop probability, driven by the ultimate goal of mapping the AQL of the target average delay onto an ideal packet drop probability $p^*(t)$ that continuously matches the phantom drop rate $\phi(t)$. As noted by the authors, the control algorithm specified in [Floyd, 2001] is not necessarily optimized for accuracy and speed of convergence.

As stated above, while certain flaws of ARED can be corrected with simple modifications of the algorithm that controls the slope of the packet drop probability, other flaws are intrinsic of the RED definition, so that their resolution calls for a radically different approach to the early detection of congestion conditions. Accordingly, aspects of the present invention will now be described.

Periodic Early Discard

The present invention defines a buffer management scheme called Periodic Early Discard (PED). Compared to state-of-the-art buffer management technologies, the PED scheme clearly improves critical performance metrics such as link utilization (throughput) and average queueing delay and minimizes the configuration complexity (once the available memory size is defined by system design, all parameters have fixed values, or can be customized based on specific performance goals).

The invention provides a method for drastically reducing the amount of memory needed for the implementation of packet buffers in network elements, enabling the implementation of such buffers on-chip as opposed to current off-chip implementations. The benefits of this architectural advance are extreme with respect to energy consumption and system scalability and integration, as more packet-processing components can now fit into a smaller space. The elimination of off-chip memories simplifies the design of network systems, enabling higher integration and improving energy efficiency. Smaller memories also reduce the contribution of a network buffer to the end-to-end delay experienced by network application packets without reducing the utilization of the network links and without increasing the completion time of the TCP flows that traverse the buffer (the completion time of a TCP flow is the time needed to transport an entire data object, such as a Web page, from the TCP sender to the TCP receiver).

The basic idea of the invention stems from the observation that, in the presence of TCP traffic, the length of a queue can be stabilized by selection of an appropriate frequency for packet dropping. For any combination of number of TCP connections and distribution of the respective RTT values, there exists an ideal phantom drop rate $\phi(t)$ that prevents the queue from over-flowing or under-flowing. While the value of the phantom drop rate may quickly change over time and is sensitive to the series of TCP connections affected by past packet losses, and most of all is impossible to compute inline, it is conceivable to approximate it with a margin of error that allows keeping the queue occupancy within a pre-defined range for extended periods of time. The PED scheme aims at tracking the (unknown) phantom drop rate, adjusting the approximated value of the rate based on the evolution of the queue occupancy, with rate corrections that occur at a timescale that is comparable to the aggregate time constant of the set of TCP connections that traverse the queue.

PED builds on the experimental evidence that a stable instance of RED is one that associates a fixed packet drop probability with an extended range of AQL values so that ordinary increases of the AQL (as it catches up with the IQL) do not translate into higher packet drop rates and global synchronization. To consistently enforce the desired packet drop rate, we also replace the notion of packet drop probability, which yields variable inter-drop intervals, with a packet drop period that enforces equally spaced packet drop events and motivates the name of the invention.

In its general formulation, PED combines two components that operate at different timescales. At the shorter (packet) timescale, PED drops packets at fixed time intervals when signs of congestion are evident. At the longer (RTT) timescale, a control algorithm adjusts the packet drop period to the evolution of the AQL.

The following properties of the PED methodology of the present invention should be noted, aspects of which would be understood by those persons skilled in the art:

1. Simpler implementations of PED may not include the control algorithm for dynamic adjustment of the packet drop period. These implementations operate with a constant packet drop period, whose value may be set by the network operator depending on the placement of the packet buffer within the network.

2. PED may be used to control the admission of packets to a buffer either in conjunction with other buffer management schemes or in isolation. In all cases where PED is used, one or more packets are discarded when the buffer has no sufficient space to accommodate a new incoming packet.

3. While the present description focuses on the use of PED as a method for deciding whether or not a new packet is to be admitted to the buffer, the present invention methodology lends itself without restriction to the more general application of packet marking, where a field in the packet header is modified to notify either downstream buffers that they can consider the packet for dropping with higher probability than other packets, or simply the end receiver of the packet that the associated flow is experiencing network congestion along its data path and that the traffic generation activity of the respective source should be reduced.

4. While in the present description the outcome of the PED execution applies to entire packets, versions of PED that apply to sub-packet data units such as bytes and memory words can be identically implemented.

PED uses a drop timer with period $\tau_D$ of controllable duration to trigger the sampling of the IQL q and AQL $\bar{q}$ and their comparison with respective thresholds $b_{min}^{PED}$ and $b_{gate}^{PED}$ ($b_{min}^{PED} > b_{gate}^{PED}$) as is explained in greater detail herein. If $q > b_{min}^{PED}$ AND $\bar{q} > b_{gate}^{PED}$ when the drop timer expires, PED drops (or marks) the next incoming packet; otherwise it accepts into the queue the next packet and all the packets that follow, up to the next expiration of the drop period.

PED controls the period $\tau_D$ of the drop timer based on the AQL evolution. At time intervals preferably shorter than a time constant T that is large enough to include the RTT values of most TCP connections. (e.g., T=500 ms), PED compares $\bar{q}$ with the minimum PED threshold $b_{min}^{PED}$ and a maximum PED threshold $b_{max}^{PED}$. PED increases $\tau_D$ if $\bar{q} < b_{min}^{PED}$ and decreases it if $\bar{q} > b_{max}^{PED}$. In both cases, the new value of the drop period $\tau_D[m]$ at correction event in is derived from both the current value $\tau_D[m-1]$ (set at correction event m-1) and the previous value $\tau_D[m-2]$ (set at correction event m-2). The size of the period correction is modulated by the ratio between the AQL and the relevant threshold ($\bar{q}/b_{min}^{PED}$ for period increases and $b_{max}^{PED}/\bar{q}$ for period decreases). The period of the drop timer remains unchanged every time the AQL is found to be in between the two thresholds.

Figure 3:
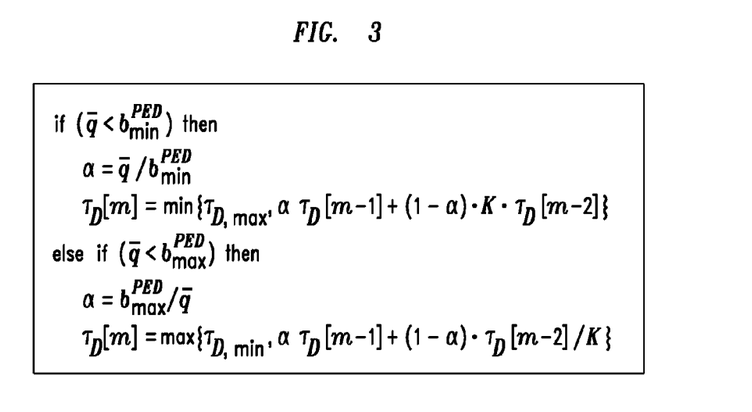
FIG. 3 shows exemplary Pseudo-code for a drop period update in accordance with the present invention.

Referring to FIG. 3, pseudo-code is shown for an exemplary implementation of a drop period update. The code summarizes the update of the packet drop period after at least a time T has elapsed since the latest drop period update. In the equations of FIG. 3, α is either the ratio between the AQL and the minimum PED threshold (for period increases) or the ratio between the maximum PED threshold and the AQL (for period decreases), and K is the maximum size of the period correction (the correction is maximum when α=0).

PED uses a synchronous, time-driven background process for updating the AQL. The criteria for setting the averaging period $\tau_q$ are similar to those of the synchronous versions of RED: the period should be larger than the inter-departure time of packets of typical size at the output capacity of the queue (e.g., $\tau_q \geq 1500$ B/40 Gbps=0.3 μs), but not larger than a small fraction (e.g., 5%) of the target average delay (e.g., $\tau_q \leq 0.05 \cdot 1$ ms=50 μs). As usual, PED computes the AQL $\bar{q}$ as an exponential weighted moving average (EWMA): $\bar{q}[n] = w \cdot q[n] + (1-w) \cdot \bar{q}[n-1]$. The EWMA weight w is defined by the ratio between the averaging period and the time constant of the low-pass filter instantiated by the EWMA: $w = \tau_q / T$.

In order to prevent ordinary TCP dynamics from diverting the control of the drop period from its goal of matching the phantom drop rate, PED also includes provisions for: to (a) suspending the corrections of the drop period $\tau_D$ under low-load conditions that are not the consequence of recent packet drop events; (b) resetting the drop period to the minimum value available after the buffer occupancy grows from empty to full within a time that is comparable with the time constant T (such an event is a sign that the current packet drop period is too large for dealing properly with the current traffic mix); and (c) allowing emergency corrections of the drop period even before expiration of the time constant T as soon as the AQL exceeds a safety threshold $b_{safe}^{PED} > b_{max}^{PED}$.

PED differs from RED in many ways. As already discussed, PED keeps the packet drop rate fixed for a minimum time T instead of changing it continuously with the It minimizes the variations in the inter-drop times by replacing the packet drop probability with a fixed packet drop period.

Another important element of novelty in PED is the careful consideration of the effects that data path and filtering delays have on the interaction between the buffer management scheme and the TCP source dynamics. It takes a time comparable with the RTT for a source to recognize a packet loss and for that recognition to produce visible effects on the IQL of the bottleneck queue. Because of the EWMA with time constant $T \geq \bar{\theta}$ it takes a similar extra time for the AQl, to catch up with the IQL variation. The accuracy of the control mechanism that tracks the phantom drop rate depends tightly on the time distance between the adjustments in the activity of the TCP sources and the corrective actions on the queue length that drive those adjustments. While the delay induced by the RTT cannot be avoided, PED excludes the extra delay contribution of the EWMA by giving the IQL the prominent role in defining the packet drop decision. It is true that PED also checks the AQL to confirm that early signs of congestion are present, but the threshold $b_{gate}^{PED}$ used for this purpose is only half the size of the main threshold $b_{min}^{PED}$, so that the EWMA delay has practically no impact on the decision. Similarly, in setting the packet drop period at correction event m we let $\tau_D[m-2]$ give an extra contribution to $\tau_D[m]$ (besides the one already included in $\tau_D[m-1]$) because the state of the queue that is observed at event m ($q(t_m), \bar{q}(t_m)$) may depend on $\tau_D[m-2]$ much more than on $\tau_D[m-1]$. In fact, the sources affected by the packet losses triggered by drop period $\tau_D[m-1]$ may not even have started reacting to those losses by the time $\tau_D[m]$ is set.

PED Configuration

Excellent performance and low implementation complexity cannot compel the pervasive deployment of a new algorithm in network equipment if the algorithm is not also simple to configure. In this section we list an exemplary set of configuration parameters that drive the operation of PED. Since we offer exemplary recommendations for the values of relevant parameters, the configuration of PED is straightforward and can be fully automated once the link rate and the amount of available memory are known. As would be appreciated, the exemplary configuration parameters show but one embodiment for implementation of the present invention and other parameters may be chosen depending on specific network objectives.

Parameter is the total buffer space available; its value is set by hardware design constraints, such as the size of the available buffer memory (e.g., $Q_{max}$=32 MB for the on-chip implementation of buffer memories in our illustrative traffic scenarios, for which simulation results are shown in FIGS. 6, 7, 8, and 9).

Parameter $b_{min}^{PED}$ is the minimum PED threshold; it should be set as a fixed fraction (e.g., 20%) of the total buffer space available (e.g., $b_{min}^{PED}$=6.4 MB in our examples).

Parameter $b_{max}^{PED}$ is the maximum PED threshold; it should be twice as large as the minimum PED threshold (but other values higher than $b_{min}^{PED}$ are not prohibited): $b_{max}^{PED}$=2$b_{min}^{PED}$ (e.g., $b_{max}^{PED}$=12.8 MB in our examples).

Parameter $b_{safe}^{PED}$ is the safety PED threshold; it should be three times as large as the minimum PED threshold (but other values higher than the maximum PED threshold are not prohibited): $b_{safe}^{PED}$=3$b_{min}^{PED}$ (e.g., $b_{safe}^{PED}$=19.2 MB).

Parameter $b_{gate}^{PED}$ is the gating PED threshold; no packet is dropped as long as the AQL is below this threshold; it should be half the size of $b_{min}^{PED}$ (e.g., $b_{gate}^{PED}$=3.2 MB).

Parameter $\tau_q$ is the update period for the AQL; it should be large enough to avoid multiple updates of $\bar{q}$ while the same packet is in transmission out of the queue (e.g., $\tau_q$=10 µs).

Parameter T is the time constant of the control system made of the bottleneck link and the set of TCP senders and receivers whose packets traverse the link; it is also the inverse of the cutoff frequency of the low-pass filter that implements the computation of $\bar{q}$; to make sure that the RTT values of most TCP connections are included, especially when their actual distribution is unknown, the value of T should be set to 500 ms; lower values are not prohibited when the RTT distribution is known to be concentrated around a definitely smaller value.

Parameter w is the weight used for the computation of the AQL as an EWMA; its value is derived directly from the values chosen for the averaging period $\tau_q$ and for the time constant T: w=$\tau_q$/T (e.g., w=0.00002).

Parameter $\tau_D^{(l)}$ is the minimum value admitted for the PED drop period $\tau_D$; it should be at least as large as the averaging period $\tau_q$ (e.g., $\tau_D^{(l)}$=100 µs).

Parameter $\tau_D^{(u)}$ is the maximum value admitted for the PED drop period $\tau_D$; it should be larger than the estimated value of $\bar{\theta}$, but not larger than T (e.g., $\tau_D^{(u)}$=500 ms).

Parameter K is the fixed correction factor used for updating the packet drop period $\tau_D$ (e.g., K=2; larger values make the control loop faster but less stable).

As discussed previously, the exemplary configuration parameters reflect one exemplary embodiment of the present invention. Those skilled in the art would recognize that other parameters and parameter values may be chosen.

PED Operation

The following variables are involved in the operation of PED.

Variable q is the IQL; it may be measured in packets or sub-packet data units such as bytes or memory words.

Variable $\bar{q}[n]$ is the AQL between times $n\tau_q$ and $(n+1)\tau_q$, where n is an integer number; it is measured in the same units as the variable q.

Variable $\tau_D$ is the PED drop period, whose duration is controlled by the evolution of $\bar{q}$.

Auxiliary variables for running our exemplary embodiment of the algorithm include the time $t_U$ of latest update of the PED drop period, the time $t_z$ when the queue last became empty, the time $t_D$ when PED last made the decision to drop a packet, and the drop flag $f_D$ that indicates whether or not the next incoming packet should be dropped.

Figure 4:
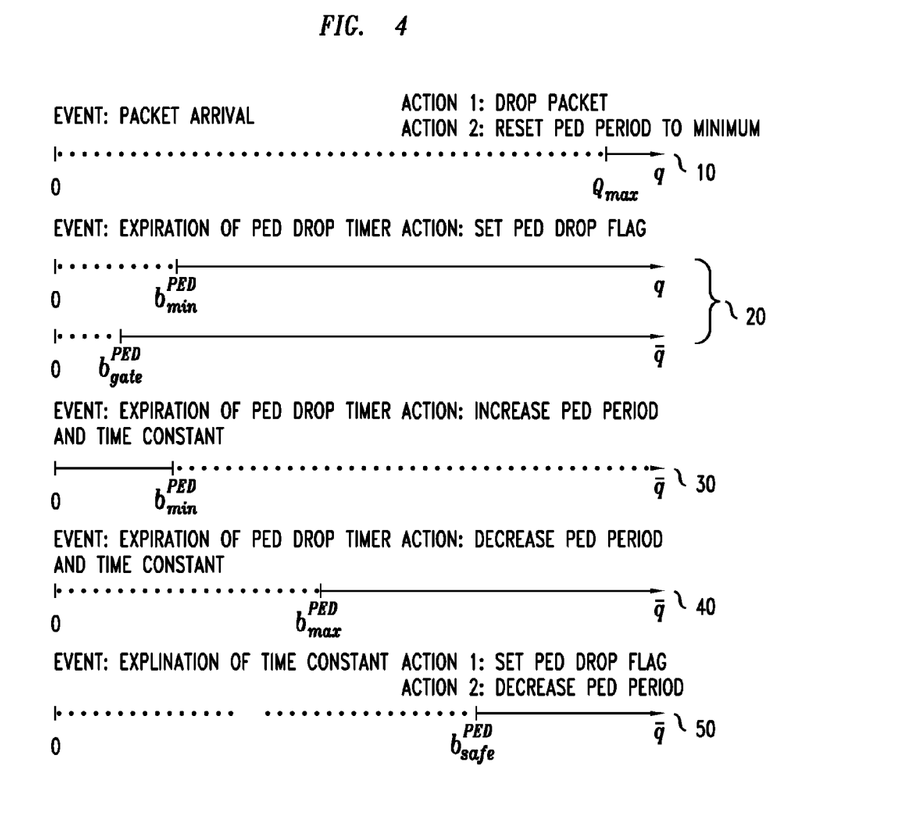
FIG. 4 shows a summary of events for execution of the PED algorithm.

FIG. 4 summarizes the use of thresholds in the PED scheme. In each section of the drawing, the solid portion of the queue-length line indicates the range of values of the reference measure (IQL or AQL) within which the listed action(s) is (are) applied. The comparison of the measures with the respective thresholds is triggered by the events listed for each section. As shown for a packet arrival event 10, when the IQL q exceeds a threshold $Q_{max}$ two actions are taken. These actions are to drop the incoming packet and to reset the PED period to its minimum. A next action is the expiration of the PED drop timer 20. When the IQL has reached the minimum PED threshold $b_{min}^{PED}$ and the AQL has reached the PED gating threshold $b_{gate}^{PED}$, the drop flag is set. At a next event, the expiration of the PED drop timer and time constant 30, the PED period increases if the minimum PED threshold $b_{min}^{PED}$ has not been reached. For this same event, the expiration of the PED drop timer and time constant shown in 40, if the maximum PED threshold $b_{max}^{PED}$ is reached for the AQL, then the PED period is decreased. As shown in 50, at the expiration of the time constant, if AQL has exceeded the PED safety threshold $b_{safe}^{PED}$, the PED drop flag is set and the PED period is decreased.

Figure 10A:
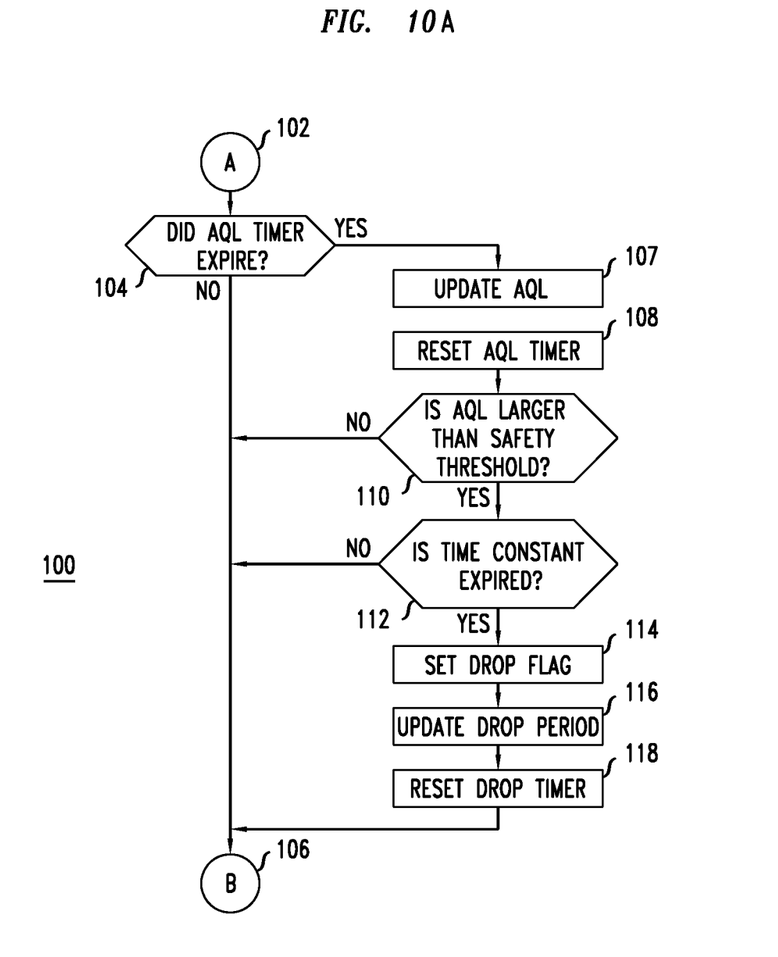
FIGS. 10a, 10b and 10c show an exemplary flow diagram for the Periodic Early Discard (PED) methodology of the present invention.

Referring now to FIG. 10a, a flow diagram 100 is shown for the implementation of the overall FED methodology in accordance with the present invention. The flow begins at beginning point A 102. Next, at a first step 104, a decision box is reached and it is determined whether the AQL timer has expired. If not the flow proceeds to transition point B 106. If the AQL has expired, then the flow proceeds to step 107 where the AQL value is updated. At step 108, the AQL timer is reset and the flow proceeds to decision box 110, where it is determined whether the AQL timer is larger than the safety threshold. If so, the flow proceeds to another decision box 112, where it is determined if the time constant has expired. If so, the flow proceeds to step 114 where the drop flag is set. If either of the decision boxes 110 or 112 reaches a "No" decision, then the flow proceeds to transition step B 106. After the drop flag has been set at step 114, the flow proceeds to step 116, where the drop period is updated. The drop timer is next reset at step 118 and the algorithm proceeds to transition step B 106.

Figure 10B:
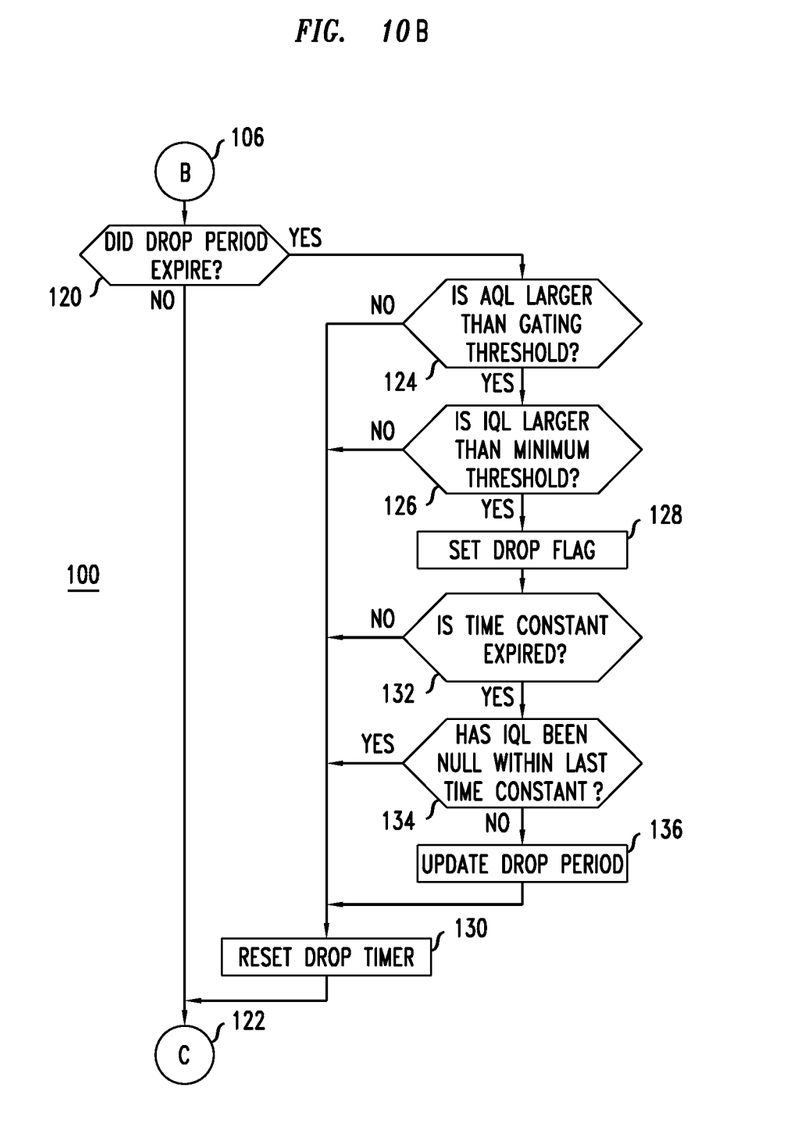

Referring to FIG. 10b, the flow of the present invention methodology continues. After transition step B 106, a decision box 120 is reached where it is determined whether the drop period has expired. If not, the flow proceeds to transition step C 122. If the drop period has expired, a check is carried out at decision box 124 to determine whether the AQL is larger than the gating threshold $b_{gate}^{PED}$; if a "Yes" decision is reached, the flow proceeds to a next decisions box 126, where it is determined whether the IQL value, is larger than the minimum threshold. If the IQL value is larger than the minimum threshold, then the drop flag is set at step 128. If either of the decision boxes 124 or 126 comes to a "No" decision, then the flow proceeds directly to step 130 where the drop timer is reset.

After the drop flag is set at step 128, a next decision box 132 is reached where it is determined whether the time constant is expired. If the time constant is expired, we proceed to a next decision box 134 where it is determined whether the IQL has ever been null within the last time interval of duration equal to the time constant. If the IQL has never been null within the last time interval of duration equal to the time constant, then the drop period is updated at step 136. If the decision box 132 comes to a "No" decision or the decision box 134 comes to a "Yes" decision, then the flow proceeds directly to step 130 where the drop timer is reset. After the drop timer is reset, the algorithm flow proceeds to transition step C 122.

Figure 10C:
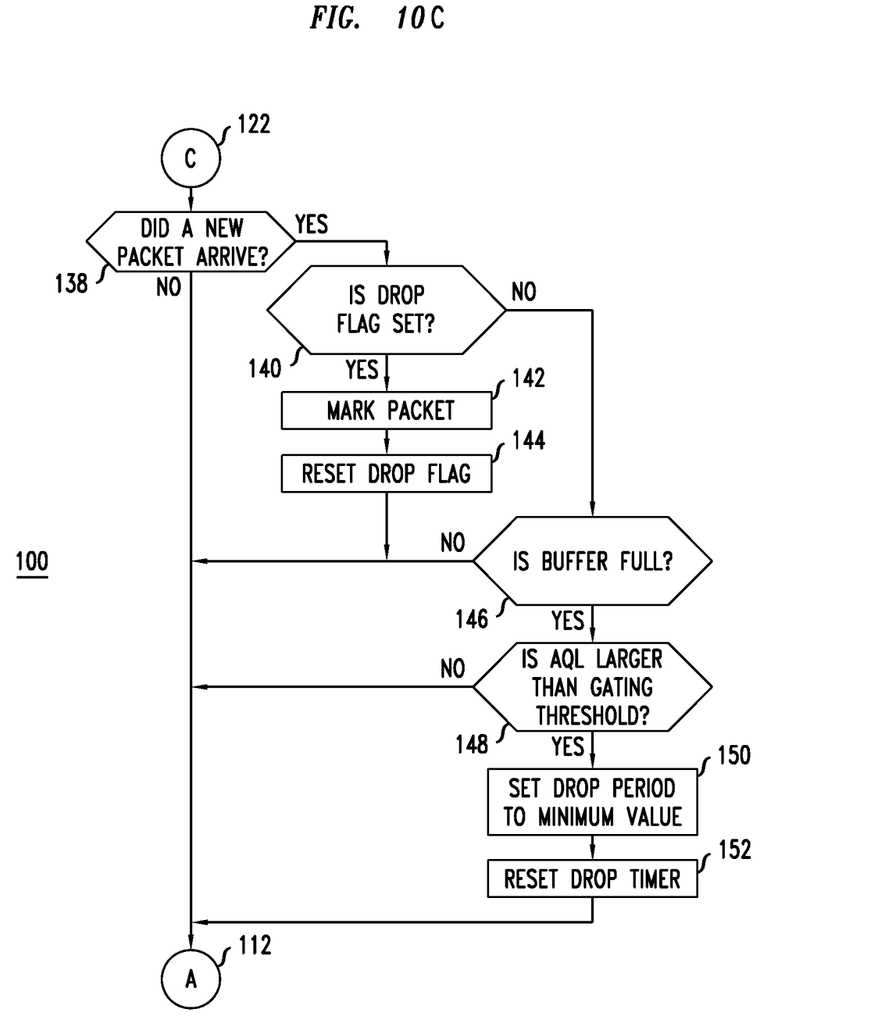

After transition point C, we reach decision box 138, where it is determined whether a new packet has arrived. If not, the flow proceeds again to beginning point A 112. If a new packet has arrived, it is determined whether the drop flag is set at decision box 140. If the drop flag has been set, then the packet is marked at step 142 and the drop flag is reset at step 144. The flow then proceeds to beginning point A 112. If a "No" decision is reached at decision box 140 and the drop flag is not set, then we proceed to decision box 146 where a determination is made as to whether the buffer is full. If the buffer is full, then a check is made to see whether the AQL is greater than the gating threshold at decision box 148. If the AQL is greater than the gating threshold, then the drop period is set to a minimum value at step 150. Next, the drop timer is reset at step 152 and the flow proceeds to beginning point A 112. If either of the decision boxes 146 or 148 comes to a "No" decision, then the flow proceeds directly to beginning point A 112.

PED Performance

Figure 5:
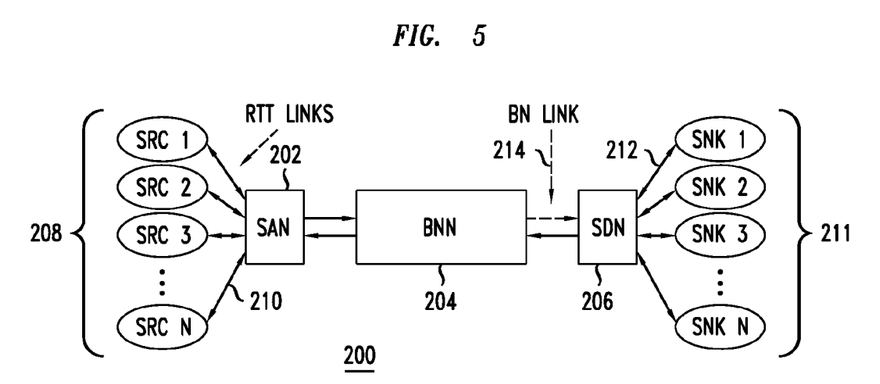
FIG. 5 shows an exemplary network configuration.

Referring to FIG. 5, an exemplary network topology 200 is shown, which includes a source aggregation node (SAN) 202, a bottleneck node (BNN) 204, and a sink distribution node (SDN) 206. A network simulator platform is used to study the link utilization performance of the periodic early discard method of the present invention. A number N of TCP Reno sources 208 are attached by respective 1 Gbps links 210 to the SAN. The propagation delay of each of these links sets the RTT of the respective TCP flow. The propagation delay of all other links is negligible. The TCP sinks 211 are attached to the SDN, also by 1 Gbps links 212. All links between network nodes have 40 Gbps capacity, with the exception of the bottleneck link 214 from the BNN to the SDN, whose capacity is lower than 40 Gbps (we set different values of bottleneck rate in different experiments). The total buffer space available at the bottleneck queue is 32 MB, well within the reach of on-chip, buffer implementations. We configure the PED parameters with the exemplary values given previously as: $\tau_q=10$ μs, T=500 ms, $b_{gate}^{PED}=3.2$ MB, $b_{min}^{PED}=6.4$ MB, $b_{max}^{PED}=12.8$ MB, $b_{safe}^{PED}=19.2$ MB, $Q_{max}=32$ MB, $\tau_D^{(l)}$ T=100 μs, and $\tau_D^{(u)}=T=500$ ms.

We study the performance of PED by simulation of the network configuration of FIG. 5, with the traffic setups of Scenarios 1 and 2 as described below. The results that we present are selected out of a much larger set where no exceptions can be found to the key outcomes that we are going to illustrate. Scenario 1 has N=1000 TCP flows, all with θ=200 ms. The number of flows and the RTT value, both relatively large, challenge the ability of the early discard algorithm to distribute the packet losses adequately. Since the RTT is the same for all flows, we expect to observe heavy queue length oscillations induced by ordinary TCP dynamics. If packets are dropped too sparsely, the queue will easily overflow. If the packets are dropped too frequently, global synchronization will occur. In Scenario 2 we downsize the TCP flow population to N=100 in order to stress the accuracy of the early discard scheme in the approximation of the phantom drop rate (a single packet drop event has sizable impact on the overall traffic load), and distribute the RTT values uniformly between 10 ms and 290 ms ($\bar{\theta}=150$ ms) in order to test the robustness of the scheme against the sub-optimal assignment of packet losses to TCP flows.

Figure 6:
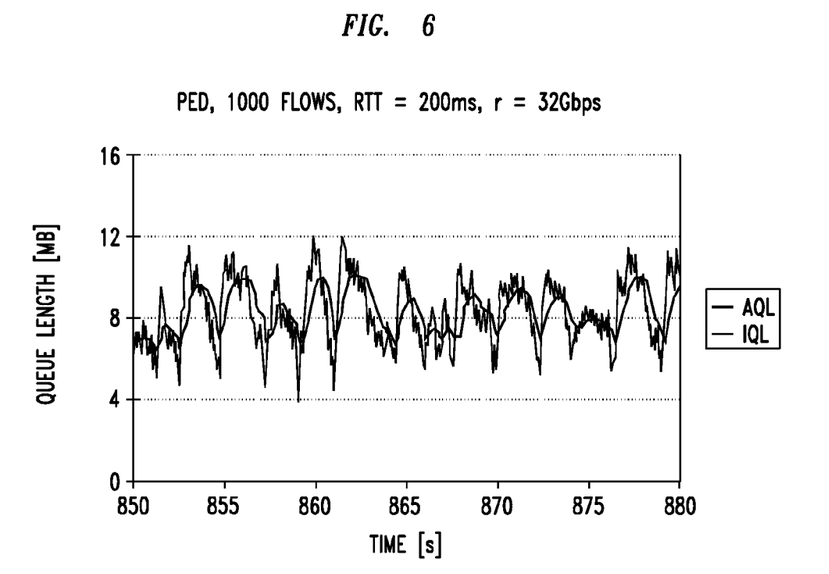
FIG. 6 shows a plot for average and instantaneous queue length in a PED buffer obtained from the simulation of a first illustrative traffic scenario.

We run the first exemplary simulation experiment with Scenario 1. In FIG. 6 we plot the evolution of the AQL, and IQL over a 30 s interval when the bottleneck rate is 32 Gbps. The measured link utilization is 100%. The graph clearly highlights the critical role of a stable packet drop period (we observe that it fluctuates narrowly around 20 ms) in preserving the long-term stability of the queue, despite the oscillations that both the IQL and the AQL naturally undergo.

Figure 7:
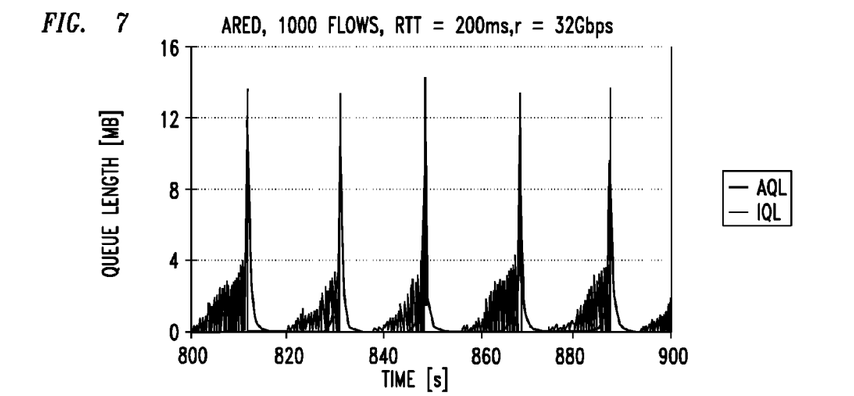
FIG. 7 shows a plot for average and instantaneous queue length in an ARED buffer obtained from the simulation of a first illustrative traffic scenario.
Figure 8:
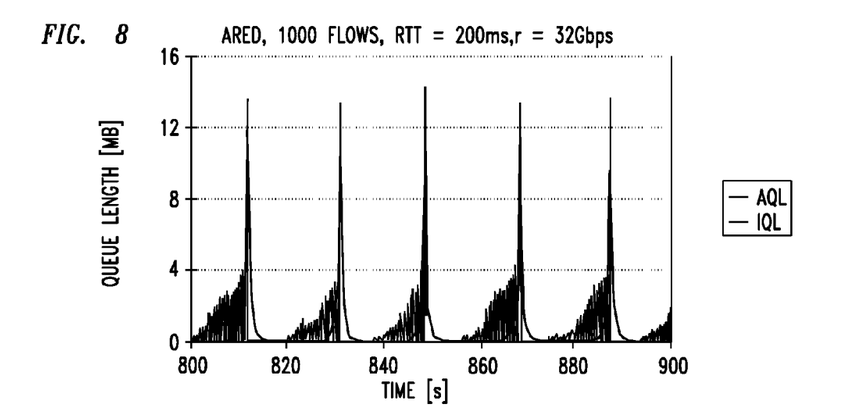
FIG. 8 shows a plot with a 0.5 s time interval detail extracted from the plot of FIG. 7.

For comparison with FIG. 6, we plot in FIG. 7 the evolution of the AQL and IQL when the ARED scheme is utilized in the bottleneck queue, with the configuration parameters recommended in [Floyd, 2001]. Over the 100 s period covered by the plot we measure the link utilization at 79.6%. The maximum drop probability $p_{max}$ never moves from the minimum allowed value (0.01) during the entire interval. FIG. 7 explains the loss of link utilization with the periodic onset of global synchronization conditions. We remark that packet losses are always the result of ARED decisions and never the consequence of a buffer overflow (the IQL is always far below $Q_{max}=32$ MB). We turn to the finer time granularity of FIG. 8 to find striking evidence that it is the monotonic nature of the packet drop probability function of ARED (and more generally of RED) that causes global synchronization and therefore the instability of the early detection algorithm. In FIG. 8 the IQL peaks around time $t_p=848.77$ s. By that time, the conditions for a global synchronization event have already been set by excessive packet losses. We know that excessive losses have occurred before $t_p$ because the IQL quickly drops to 0 soon after $t_p$. This implies that there is an equilibrium time $t_e < t_p$ when the packet drop probability matches the phantom drop rate at a value that could stabilize the queue length if held for an extended period of time. The actual placement of $t_e$ is irrelevant to our argument: all that matters is that the equilibrium drop probability is certainly met before the IQL starts falling. The AQL, which ARED uses for driving the packet-drop decisions, systematically trails the IQL at times when the IQL is growing, by a delay that depends on the cutoff frequency of the low-pass filter that computes the AQL (in the plot, the AQL trails the IQL by less than 500 ms). The AQL keeps increasing as long as it is smaller than the IQL, therefore also after the equilibrium time $t_e$ (and even after $t_p$). As the AQL keeps growing, the packet drop probability also grows by effect of the monotonic increasing profile of the drop probability function. This way the packet drop probability remains above the equilibrium value for a time that extends beyond $t_p$. The packet losses that occur between $t_e$ and $t_p$, in excess of the losses required for the equilibrium by the phantom drop rate, are those responsible for the onset of the global synchronization event. The behavior shown in FIGS. 7 and 8 is caused by the inability of any RED embodiment to lock on the equilibrium condition after reaching it, which ultimately derives from the strictly increasing nature of the drop probability function. Instead, the PED scheme of the present invention holds on a close approximation of the phantom drop rate as long as the approximation proves capable of keeping the AQL within the range delimited by the two thresholds $b_{min}^{PED}$ and $b_{max}^{PED}$.

Figure 9:
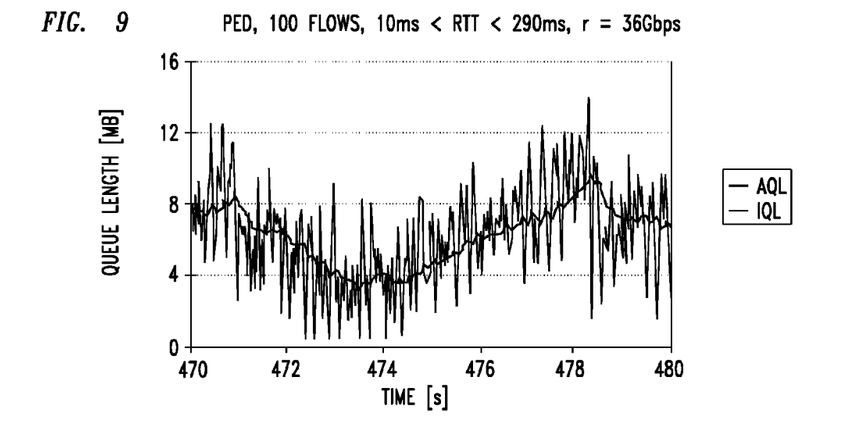
FIG. 9 shows a plot for average and instantaneous queue length in a PED buffer obtained from the simulation of a second illustrative traffic scenario.

We run a second exemplary experiment with Scenario 2. In FIG. 9 we plot the evolution of the AQL and IQL over a 10 s interval when the bottleneck rate is 36 Gbps The measured link utilization is 99.947%. Compared to Scenario I (FIG. 6), the width of the IQL oscillations increases, but PED still manages to keep the link utilization close to 100%. It is important to remark that at steady state the PED drop period settles permanently on the maximum allowed value of 500 ms, indicating that the PED control loop would likely push the value higher if a wider range was available. However, the value limitation on the maximum PED drop period does not compromise the throughput performance, because a proper time separation between subsequent packet drop events is still enforced by the gating of the packet drop decision through comparison of the AQL with the gating threshold $b_{gate}^{PED}$.

We will now discuss some of the differences between the PED methodology of the present invention and other prior art methodologies, as well as the motivation for some of those differences:

1. As opposed to the original RED and to ARED, the maintenance of the AQL in PED is a time-driven process instead of an event-driven one. The AQL is updated at fixed times instead of times of packet arrivals. This way it is possible to establish a deterministic relationship between the weight of the EWMA that defines the AQL value and the cutoff frequency of the low-pass filter instantiated by the EWMA. This prevents TCP dynamics confined within the WIT timescale from improperly contributing to the control of the drop period $\tau_{PED}$. It also makes the configuration of the EWMA weight w straightforward (it can be fixed if the RTT distribution is unknown, or it can be tailored to the RTT distribution when a reasonable estimate of that distribution is available).

2. In a queue with long-lived bottlenecked TCP connections, stability is achieved when the packet-drop frequency balances the growth in traffic generation rate of the sources that are in congestion avoidance state. For every number N of long-lived connections and for every distribution of their RTT values, there is an ideal packet drop frequency φ(t) such that the resulting reduction in source activity exactly matches the increase in source activity of the sources that are not affected by the packet losses. The exact value of the frequency is hard to obtain analytically in a practical system, because multiple factors of harder quantification contribute to its determination (for example, whether the connections affected by subsequent packet drops are always different or multiple drops per connection occur within short time periods). However, we can still assume that such a value exists for any possible state of the system at any given time. If stability of the queue is guaranteed for a certain amount of time when the error in the estimation of that value is within a reasonable margin, then it is possible to maintain the queue in such imperfect equilibrium for most of its congested time, as long as the packet-drop frequency keeps tracking the ideal reference value within bounded error margins. With PED, once the approximated frequency value is identified, it is deterministically enforced by the expiration of the drop timer. With RED and ARED, instead, wide fluctuations can still be observed around the average frequency value set by the target drop probability. Also, every incoming packet may find a different AQL and therefore a different dropping probability, further increasing the inaccuracy of the control.

3. In control theory terms, RED and ARED use the AQL to control the drop probability, so that each value of drop frequency needed to balance the queue translates to first into a drop-probability value, and then into a specific value of AQL. The higher the drop frequency needed, the higher the AQL that establishes the equilibrium (ARED improves over RED, at least nominally, by adjusting the range of drop probability values based on the current traffic conditions). The PED scheme, instead, separately controls the drop frequency and the AQL, so that different drop frequencies can be enforced with the same AQL (and corresponding average queueing delay).

4. RED and ARED drop packets after comparison of the AQL with a buffer occupancy threshold. PED compares instead the IQL. The reason for not using the AQL (which in PED remains instrumental to the control of the drop period $\tau_{PED}$) is that the AQL adds a delay, component comparable to T (and therefore $\bar{\theta}$) to the control of the TCP source activity. A delay comparable to $\bar{\theta}$ is already present because of the timeout used by the TCP sources to detect packet loss events. As a consequence, any packet drop decision is made without considering that some TCP sources may already be in the process of reacting to previous packet losses, which is a cause of inaccuracy in the packet drop decision. Basing the packet drop decision on the AQL, which lags the IQL evolution by a delay T, adds the time T to the total delay of the control loop that regulates the activity of the TCP sources using packet losses at the bottleneck queue. As a result, the inaccuracy of the packet drop decision is further increased in RED and ARED.

5. The PED scheme suspends the algorithm that controls the drop period $\tau_{PED}$ when the queue becomes empty and the PED scheme is ruled out as the cause for the empty state. Depending on the system parameters (number N of long-lived TCP connections and distribution of the respective RTT values), after a pause in source activity it may take a long time for congestion to occur again at the queue. Since the PED scheme has no role in defining the duration of this low-load time period, the drop period $\tau_{PED}$ should not be modified during this time.

6. The PED scheme resets the drop period $\tau_{PED}$ to the minimum allowed value $\tau_{PED}^{(l)}$ when the queue overflows before the AQL can even exceed the gating threshold. Such an overflow event indicates that the PED scheme has been having no role in smoothing out fast oscillations in queue occupancy, most likely because the drop period $\tau_{PED}$ is too high and the AQL is still low. The oscillation between long periods of low load and short-lived overflow events does not favor an exit from this state. Thus, to create a new chance for the control algorithm to lock again onto a close range around the ideal packet drop frequency, the TIED scheme forces a return to the state of highest drop frequency possible, which most likely avoids the next overflow event.

7. The PED scheme also allows the early interruption of a drop interval and a downward correction of the drop period $\tau_{PED}$ when the AQL exceeds the safety threshold $b_{safe}^{PED} > b_{max}^{PED}$. This is to help avoid buffer overflow events when the AQL is high but the drop period $\tau_{PED}$ is also still too high to allow proper containment of the IQL growth.

Figure 11:
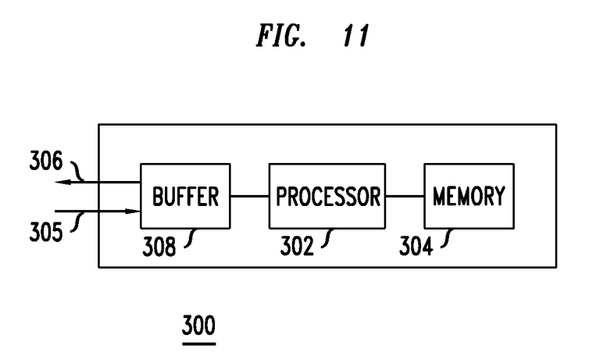
FIG. 11 shows a high level block diagram of an exemplary communications device for implementing the methodology of the present invention.

Referring to FIG. 11, there is shown one exemplary embodiment of a communications node 300 that is capable of implementing the methodology of the present invention. As can be seen, the node 300 includes at least one processor 302 which couples to system memory 304 (e.g., any forms of Random Access Memory (RAM) and Read Only Memory (ROM)). The communications node also includes a plurality of input and output ports 305, 306. One or more memory buffers 308 are utilized to buffer the communications traffic that is received at and transmitted from the communications node 300. As would be understood, the processor executes program code that is stored in memory in order to carry out the prescribed functionality of the communications node. Program code for carrying out the described methodologies of the present invention may be stored in system memory 304 and executed by processor 302.

CONCLUSIONS

With ever-increasing transmission rates in network links, the on-chip implementation of packet buffer memories is a primary requisite for the scalability and energy efficiency of next-generation routers and switches. Existing buffer management approaches such as Tail Drop and RED do not enable the necessary reductions of buffer space because they fail to avoid the global synchronization of TCP sources under common traffic scenarios. RED also suffers from the lack of a configuration strategy that guarantees high-end performance irrespective of the traffic mix.

We have provided strong evidence that the main reason for RED's shortcomings is the monotonic non-decreasing profile of the control law that derives the frequency of the packet drop events from the queue length. Accordingly, we have defined a new Periodic Early Discard (PED) scheme where the control law is flat, at a level that is adjusted at the RTT timescale. We have collected simulation results that assert PED's capability to consistently enforce 100% link utilization with long-lived TCP flows in steady state with less than 3% of the memory space used in current designs.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Many other modifications and applications of the principles of the invention will be apparent to those skilled in the art and are contemplated by the teachings herein. Accordingly, the scope of the invention is limited only by the claims.

What is claimed is:

1. A method of operating a packet buffer in a communications network, the packet buffer operable to accept multiple flows of packets, said method comprising:
    providing a drop timer of a given period, expiration of said given period triggering sampling of an instantaneous queue length (IQL) value and of an average queue length (AQL) value of said packet buffer;
    marking a next incoming packet to said packet buffer if said IQL value is greater than a minimum queue threshold of said packet buffer and said AQL value is greater than a gating queue threshold of said packet buffer;
    not marking a next incoming packet and packets that follow up to a next expiration of said given period if said IQL value is less than said minimum queue threshold of said packet buffer or said AQL value is less than said gating queue threshold of said packet buffer.

2. The method of claim 1, wherein an incoming packet that is marked is immediately dropped without being admitted to said packet buffer, and an incoming packet that is not marked is considered eligible for admission to said packet buffer.

3. The method of claim 1, wherein an incoming packet that is marked is modified in one or more of its internal fields and is considered eligible for admission to said packet buffer.

4. The method of claim 1, wherein said given period of said drop timer is fixed.

5. The method of claim 1, wherein said given period of said drop timer is variable and adjusted at given correction intervals.

6. The method of claim 5, wherein said given correction intervals for adjusting said given period of said drop timer are of fixed duration.

7. The method of claim 5, wherein:
    to said given period of said drop timer remains unchanged if said AQL value is between said minimum queue threshold and a maximum queue threshold when one of said given correction intervals expires;
    said given period of said drop timer increases if said AQL value is less than said minimum queue threshold of said packet buffer when one of said given correction intervals expires; and
    said given period of said drop timer decreases if said AQL value is greater than said maximum queue threshold of said packet buffer when one of said given correction intervals expires.

8. The method of claim 5, further including a safety queue threshold of said packet buffer, wherein emergency corrections of said given period of said drop timer may be made prior to expiration of the current one of said given correction intervals when said AQL value exceeds said safety threshold.

9. The method of claim 7, wherein:
    the increase of said given period of said drop timer is larger when the ratio between said AQL value and said minimum queue threshold of said packet buffer is smaller; and
    the decrease of said given period of said drop timer is larger when the ratio between said AQL value and said maximum queue threshold is larger.

10. The method of claim 9, wherein the new value of said given period of said drop timer is computed as a function of at least two most recent values of said given period.

11. The method of claim 1, wherein other methods for deciding on the admission or marking of next incoming packets may be in operation at the same time in the packet buffer.

12. The method of claim 1, wherein said AQL and IQL values are measured in sub-packet data units and the marking action applies to a given amount of said sub-packet data units that may be contained in one next incoming packet or in a plurality of next incoming packets.

13. The method of claim 12, wherein said sub-packet data units are bytes.

14. The method of claim 12, wherein said sub-packet data units are memory words.

15. A communications device having memory, said memory having stored therein a plurality of instructions, said device further including a packet buffer, the packet buffer operable to accept multiple flows of packets, wherein the plurality of instructions, when executed by a processor, cause the processor to perform the steps of:
    triggering sampling of an instantaneous queue length (IQL) value and of an average queue length (AQL) value of said packet buffer at expiration of a given drop period of a drop timer;
    marking a next incoming packet to said packet buffer if said IQL value is greater than a first queue threshold of said packet buffer and said AQL value is greater than a second queue threshold of said packet buffer;
    not marking a next incoming packet and packets that follow up to a next expiration of said given drop period if said IQL value is less than said first queue threshold of said packet-buffer or said AQL value is less than said second queue threshold of said packet buffer.

16. The device of claim 15, wherein an incoming packet that is marked is modified in one or more of its internal fields and is considered eligible for admission to said packet buffer.

17. The device of claim 16, further including a second device, wherein said incoming packet that is marked in one or more of its internal fields is considered for admission or dropping at said second device based on being previously marked.

18. The device of claim 15, wherein said given period of said drop timer is variable and adjusted at given correction intervals, wherein said given period of said drop timer remains unchanged if said AQL value is between said first queue threshold and a third queue threshold when one of said given correction intervals expires;

said given period of said drop timer increases if said AQL value is less than said first queue threshold of said packet buffer when one of said given correction intervals expires; and said given period of said drop timer decreases if said AQL value is greater than said third queue threshold of said packet buffer when one of said given correction intervals expires.

19. The device of claim 18, wherein:

the increase of said given period of said drop timer is larger when the ratio between said AQL value and said first queue threshold of said packet buffer is smaller; and the decrease of said given period of said drop timer is larger when the ratio between said AQL value and said third queue threshold is larger.

20. A method of operating a packet buffer in a communications network, the packet buffer operable to accept multiple flows of packets, said method comprising:

triggering sampling of an instantaneous queue length (IQL) value and of an average queue length (AQL) value of said packet buffer at expiration of a given drop period of a drop timer;

marking a next incoming packet to said packet buffer if said IQL value is greater than a first queue threshold of said packet buffer and said AQL value is greater than a second queue threshold of said packet buffer;

not marking a next incoming packet and packets that follow up to a next expiration of said given drop period if said IQL value is less than said first queue threshold of said packet buffer or said AQL value is less than said second queue threshold of said packet buffer.

* * * * *